(12) United States Patent
Takaishi

(10) Patent No.: US 7,551,391 B2
(45) Date of Patent: Jun. 23, 2009

(54) SYSTEM AND METHOD FOR CONTROLLING HEAD VELOCITY BY DEMODULATING SERVO INFORMATION

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/699,683

(22) Filed: Jan. 30, 2007

(65) Prior Publication Data

US 2008/0055770 A1    Mar. 6, 2008

(30) Foreign Application Priority Data

Aug. 30, 2006   (JP) .............................. 2006-234447

(51) Int. Cl.
*G11B 5/596* (2006.01)
(52) U.S. Cl. ................................. 360/78.06
(58) Field of Classification Search .............. 360/78.06, 360/73.03, 77.05, 75, 77.07, 77.08, 60, 77.04, 360/78.04
See application file for complete search history.

(56) References Cited

U.S. PATENT DOCUMENTS

| | | | | |
|---|---|---|---|---|
| 4,285,015 A | * | 8/1981 | Rose et al. ................ | 360/78.04 |
| 4,954,907 A | | 9/1990 | Takita | |
| 5,150,266 A | * | 9/1992 | Albert ...................... | 360/78.04 |
| 5,383,068 A | | 1/1995 | Shimizu et al. | |
| 5,475,545 A | | 12/1995 | Hampshire et al. | |
| 5,521,774 A | * | 5/1996 | Parks et al. .................... | 360/81 |
| 5,621,583 A | * | 4/1997 | Parks et al. .................... | 360/81 |
| 5,739,975 A | * | 4/1998 | Parks et al. .................... | 360/81 |
| 5,764,430 A | * | 6/1998 | Ottesen et al. ........... | 360/73.03 |
| 6,067,203 A | * | 5/2000 | Ottesen et al. ........... | 360/73.03 |
| 6,115,338 A | * | 9/2000 | Masaki et al. ............. | 369/47.52 |
| 6,285,522 B1 | * | 9/2001 | McKenzie et al. ....... | 360/77.05 |
| 6,304,406 B1 | * | 10/2001 | Douglas et al. .......... | 360/73.03 |
| 6,535,348 B1 | | 3/2003 | Kagami et al. | |
| 6,574,754 B1 | * | 6/2003 | Smith ......................... | 714/47 |
| 6,848,019 B1 | | 1/2005 | Mobley et al. | |
| 6,961,204 B2 | | 11/2005 | Shimatani | |
| 7,027,254 B2 | * | 4/2006 | Takaishi ................... | 360/77.04 |
| 7,382,563 B2 | * | 6/2008 | Saitoh et al. ................. | 360/60 |
| 2007/0097543 A1 | * | 5/2007 | Saitoh et al. ............. | 360/97.02 |

FOREIGN PATENT DOCUMENTS

| | | |
|---|---|---|
| EP | 0 378 327 | 1/1990 |
| EP | 0 456 371 | 4/1991 |
| JP | 02-168411 | 6/1990 |
| JP | 5-159488 | 6/1993 |
| JP | 08-180620 | 7/1996 |
| JP | 10-312655 | 11/1998 |
| JP | 2000-123506 | 4/2000 |
| JP | 2000-173210 | 6/2000 |
| JP | 2003-338145 | 11/2003 |
| JP | 2003-346438 | 12/2003 |
| KR | 1998-086469 | 12/1998 |

\* cited by examiner

*Primary Examiner*—Fred Tzeng
(74) *Attorney, Agent, or Firm*—Greer, Burns & Crain, Ltd.

(57) ABSTRACT

A control device demodulates servo information read from a storage medium of a storage device via a head. A velocity demodulating unit demodulates a moving velocity of the head based on the servo information. A velocity correcting unit corrects the moving velocity, when an amount of change in demodulated moving velocity exceeds a predetermined threshold.

10 Claims, 9 Drawing Sheets

SYSTEM AND METHOD FOR CONTROLLING HEAD VELOCITY BY DEMODULATING SERVO INFORMATION

BACKGROUND OF THE INVENTION

1. Field of the Invention

The present invention relate to a technology for demodulating servo-information read from a storage medium of a storage device via a head.

2. Description of the Related Art

Recently, recording density of storage devices such as a magnetic disk device, a magneto-optical disk device, and an optical disk device has been dramatically improved. With the improvement of the recording density, it is possible to downsize storage devices or increase storage capacities, which makes it easier to use the storage devices.

In a storage medium with a high recording density, an automatic control, called a servo control, is employed to operate a head to accurately position at a target track. The storage medium has a signal pattern written thereto. The signal pattern, called servo information (servo data), is used for servo control. The servo information contains information on at least a track number and a servo pattern used for demodulating a relative position of the head to a center of a track.

To operate the head to position at the center of the target track exactly, a velocity control of the head is essential as well as a positional control in which the head is operated accurately based on positional information indicating the relative position of the head to the center of the track obtained from the demodulated servo pattern. By using the servo pattern of servo information, it is possible to demodulate a detailed position of the head and a moving velocity of the head.

By controlling a current supplied to a voice coil motor for driving the head to travel based on a difference between a moving velocity of the head at the current tract and a moving velocity of the head to a target track, it is possible to operate the head to position at the target track rapidly and accurately.

However, because the demodulated moving velocity of the head is a value obtained from an estimation based on the positional information of the head demodulated from the servo information, the demodulated moving velocity may include an error and may differ from a real moving velocity.

Japanese Patent Application Laid-open No. H5-159488 discloses a device that controls velocity of a head by demodulating positional information of the head from demodulated servo information. The device is capable of correcting a range of a moving distance between a current track, at which the head is positioning, and a target track, to which the head moves, based on a previously calculated moving distance to the target track, and calculating a moving velocity of the head at the current track more correctly.

Servo-information demodulating methods in which the moving velocity is demodulated together with the positional information of the head from a demodulated signal read from the servo information are disclosed in Japanese Patent Application Laid-open No. H8-180620, Japanese Patent Application Laid-open No. H2-168411, Japanese Patent Application Laid-open No. 2000-123506, Japanese Patent Application Laid-open No. 2003-338145, Japanese Patent Application Laid-open No. 2003-346438, and Japanese Patent Application Laid-open No. 2000-173210. According to these methods, the moving velocity of the head is directly demodulated from the servo information instead of the demodulated positional information. Therefore, it is possible to demodulate a more correct moving velocity.

However, according to the above conventional technique disclosed in Japanese Patent Application Laid-open No. H5-159488, a moving velocity of the head is calculated from a moving distance of the head to a target track that is corrected based on positional information of the head obtained from demodulated servo information. Therefore, the moving velocity of the head becomes demodulated from a mere estimation, which leads to a limitation in demodulating a more correct moving velocity.

In the above conventional techniques disclosed in the other literatures, it is not considered occurrence of an overflow associated with the demodulated velocity of the head caused by an increased speed of a seek operation. The demodulated moving velocity is correct without the overflow. However, if the overflow occurs, it is hard to demodulate a correct moving velocity.

SUMMARY OF THE INVENTION

It is an object of the present invention to at least partially solve the problems in the conventional technology.

A control device according to one aspect of the present invention demodulates servo information read from a storage medium of a storage device via a head. The control device includes a velocity demodulating unit that demodulates a moving velocity of the head based on the servo information; and a velocity correcting unit that corrects the moving velocity, when an amount of change in demodulated moving velocity exceeds a predetermined threshold.

A storage device according to another aspect of the present invention includes a control device for demodulating servo information read from a storage medium via a head. The storage device includes a velocity demodulating unit that demodulates a moving velocity of the head based on the servo information; and a velocity correcting unit that corrects the moving velocity, when an amount of change in demodulated moving velocity exceeds a predetermined threshold.

A computer-readable recording medium according to still another aspect of the present invention stores therein a computer program for demodulating servo information read from a storage medium via a head. The computer program causes a computer to execute demodulating a moving velocity of the head based on the servo information; and correcting the moving velocity, when an amount of change in demodulated moving velocity exceeds a predetermined threshold.

A method of demodulating servo information read from a storage medium via a head, according to still another aspect of the present invention, includes demodulating a moving velocity of the head based on the servo information; and correcting the moving velocity, when an amount of change in demodulated moving velocity exceeds a predetermined threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. Although, according to the embodiments below, a magnetic disk is used as a storage medium and a magnetic disk device according to the present invention is used as a storage device, it is acceptable to use an optical disk and an optical disk device, a magneto-optical disk and a magneto-optical disk device, or the like.

Figure 1:
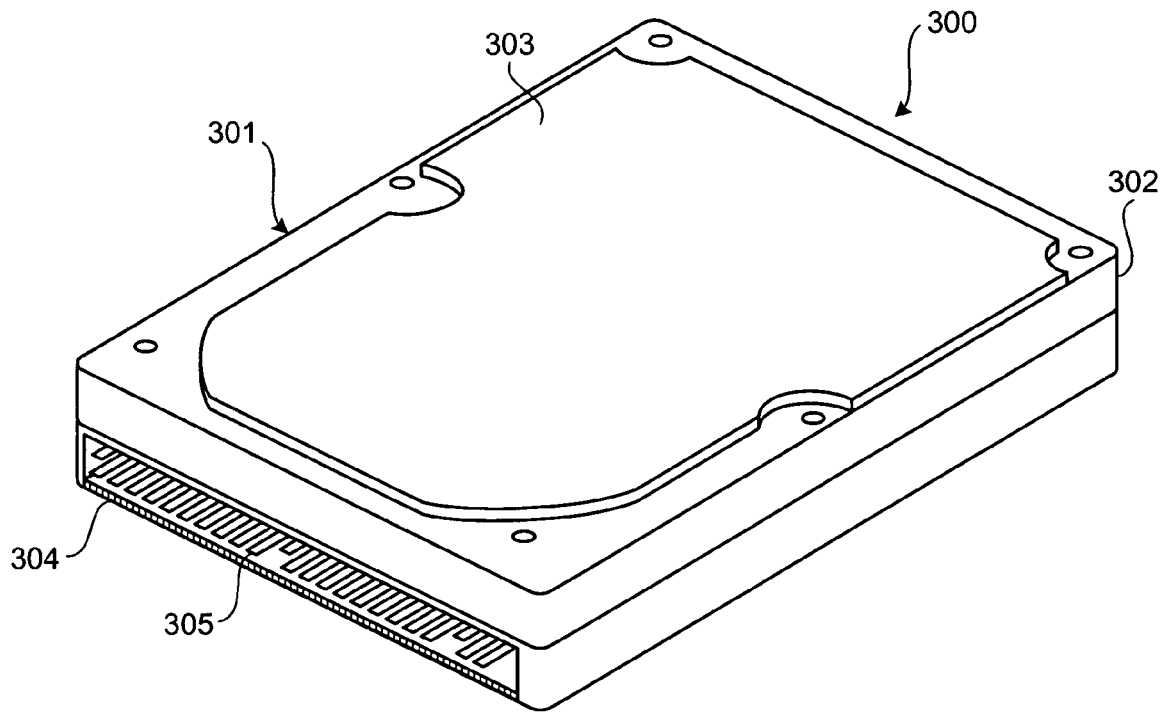
FIG. 1 is a schematic of an outer view of a magnetic disk device.

FIG. 1 is a schematic of an outer view of a magnetic disk device 300 according to an embodiment. The magnetic disk device 300 includes a box-shaped housing 301. The housing 301 is, for example, a rectangular parallelepiped surrounded by plates, and includes a box-shaped housing body 302 having a magnetic-disk storage space for storing a magnetic disk. The housing body 302 is molded from a metal, such as aluminum. The magnetic-disk storage space of the housing body 302 is attached to a cover 303. The cover 303 is formed by pressing a sheet of a metal plate. The metal sheet can be made of a laminated material with anti-vibration effect.

A printed board 304 is attached to an outside of a bottom of the housing body 302. The printed board 304 includes a processing device such as a central processing unit (CPU) (not shown), a micro control unit (MCU), and a micro processing unit (MPU), a large scale integration (LSI) chips, such as a hard disk controller, and a connector 305 that works as a physical interface for electrically connecting the magnetic disk device 300 to a host computer. The magnetic disk device 300 is entirely controlled by those main control units or the hard disk controller. The connector 305 is connected to a control-signal cable connected to a main control board of the host computer, on which the magnetic disk device 300 is mounted, a power cable (both cables are not shown), or the like. The main control unit or the hard disk controller is driven by a power supplied via the power cable.

Figure 2:
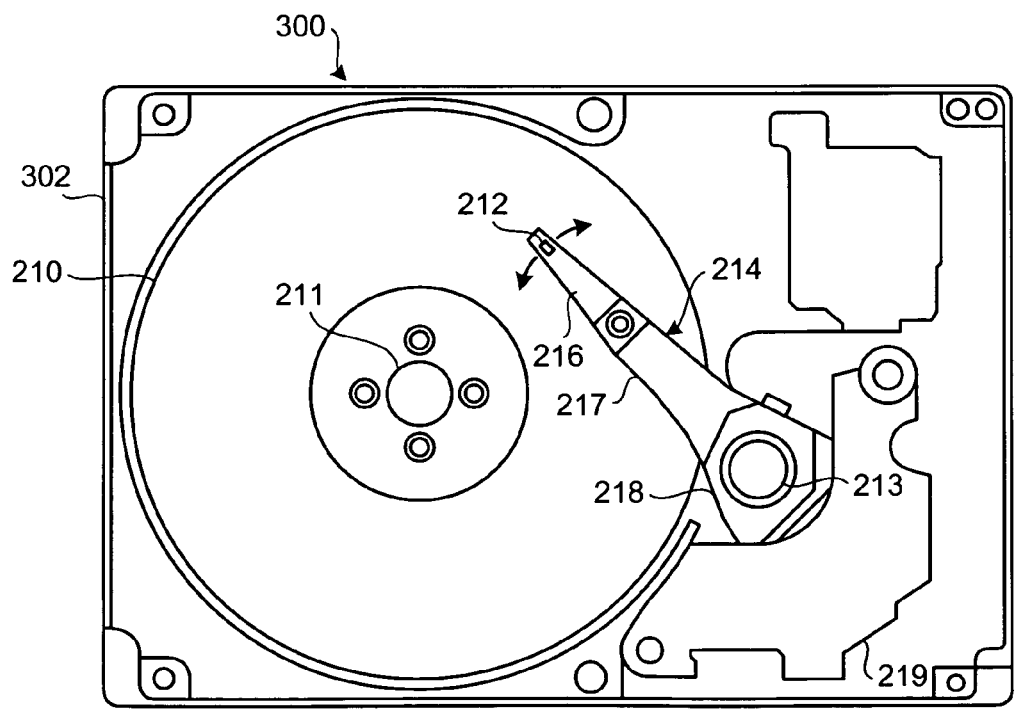
FIG. 2 is a schematic of an inner structure of the magnetic disk device.

A general inner structure of the magnetic disk device 300 shown in FIG. 1 is described below. FIG. 2 is a schematic of the inner structure of the magnetic disk device 300 shown in FIG. 1. As can be seen from FIG. 2, in which the cover 303 is removed from the magnetic disk device 300, it is found that at least one sheet of a magnetic disk 210, which works as a storage medium, is stored in the magnetic-disk storage space. The magnetic disk 210 is attached to a spinning shaft 211 of a spindle motor 209. The spindle motor 209 drives the magnetic disk 210 to spin at a high speed of, for example, 7,200 revolutions per minute or 10,000 revolutions per minute.

The magnetic disk 210 is a storage medium with a magnetic film formed on a metallic or glass platter (disk-shaped) substrate. When data is recorded onto the magnetic disk 210, a magnetic field is produced with a magnetic head over a recording area on the magnetic disk 210 to change magnetized states of magnetic substances placed on a surface. When data is read from the magnetic disk 210 for reproduction, the magnetic head is moved across the magnetic disk 210 to a recording area on which target data to be reproduced is recorded, and reads magnetized states of magnetic substances on the magnetic disk 210 to reproduce the target data.

A head actuator 214 is stored in the magnetic-disk storage space. The head actuator 214 includes an actuator block 218 rotatably supported by a spindle 213, which extends in the vertical direction. The actuator block 218 is provided at an actuator arm 217 that is a rigid body and extends from the spindle 213 in the horizontal direction. For example, the actuator block 218 is molded from aluminum.

A head suspension 216 is attached at an end of the actuator arm 217. The head suspension 216 extends forward from the end of the actuator arm 217. A floating head slider 212 is supported at an end of the head suspension 216. It means that the floating head slider 212 is connected to the actuator block 218. The floating head slider 212 is placed opposing to the surface of the magnetic disk 210.

A magnetic head (or shorten to "head") including electromagnetic conversion elements (not shown) is mounted on the floating head slider 212. The electromagnetic conversion elements are composed of a read element, such as a giant magnetoresistance (GMR) element and a tunnel magnetoresistance (TMR) element, and a write element such as a thin-film magnetic head. The GMR element and the TMR element read information from the magnetic disk 210 based on a resistance change of a spin-valve film or a tunnel-junction film. The thin-film magnetic head writes information to the magnetic disk 210 using a produced magnetic field with a thin-film coil pattern.

A force for pressing from the head suspension 216 to the surface of the magnetic disk 210 generates at the floating head slider 212. The floating head slider 212 is given buoyancy by an airflow that is generated by spin of the magnetic disk 210 on the surface of the magnetic disk 210. While the magnetic disk 210 is spinning, the floating head slider 212 keeps floating because of relatively high rigidity, as maintaining a balance between the pressing force at the head suspension 216 and the buoyancy.

The actuator block 218 is connected to a power source 219 such as a voice coil motor (VCM). The power source 219 drives the actuator block 218 to rotate around the spindle 213. The actuator arm 217 and the head suspension 216 swing, as the actuator block 218 rotates. When the actuator arm 217 swings around the spindle 213 while the floating head slider 212 is floating, the floating head slider 212 moves across the surface of the magnetic disk 210 in the radial direction. If a plurality of the magnetic disks 210 is incorporated in the housing body 302, two actuator arms 217, or two head suspensions 216, are arranged between two magnetic disks 210 adjacent to each other.

Figure 3:
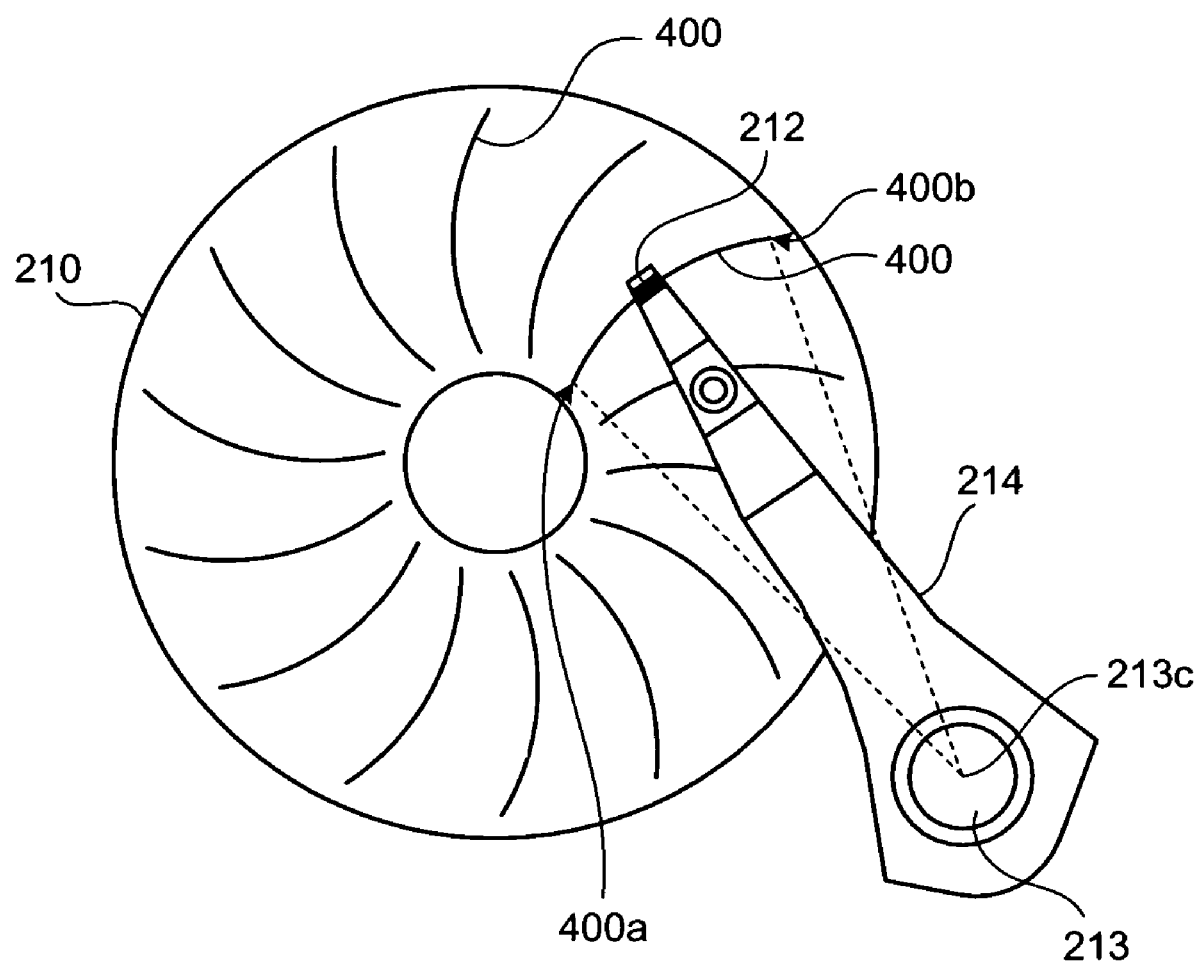
FIG. 3 is a schematic of servo information.

FIG. 3 is a schematic of the servo information that is stored in the magnetic-disk storage space inside the magnetic disk device 300 shown in FIG. 1 patterned onto the surface of the magnetic disk 210. The servo information is used for positioning the magnetic head. As shown in FIG. 3, servo information 400, which extends from a spinning center in the radial direction drawing an arch line, is recorded onto the magnetic disk 210 in a form of a magnetic pattern.

As can be seen from FIG. 3, the servo information 400 is arranged in lines on the magnetic disk 210 and the lines are arranged at even intervals. Each of the lines is arch-shaped and roughly draws a radius starting from the center to a circumference. A reason why the lines are arch-shaped is as follows. The head actuator 214, which is attaches to the floating head slider 212 including the magnetic head at the end thereof, half rotates around a central axis 213c of the spindle 213 as drawing a fan shape. As a result, the magnetic head moves from an end-point 400a to an end-point 400b, as keeping a distance from the central axis 213c to the magnetic head constant.

Figure 4:
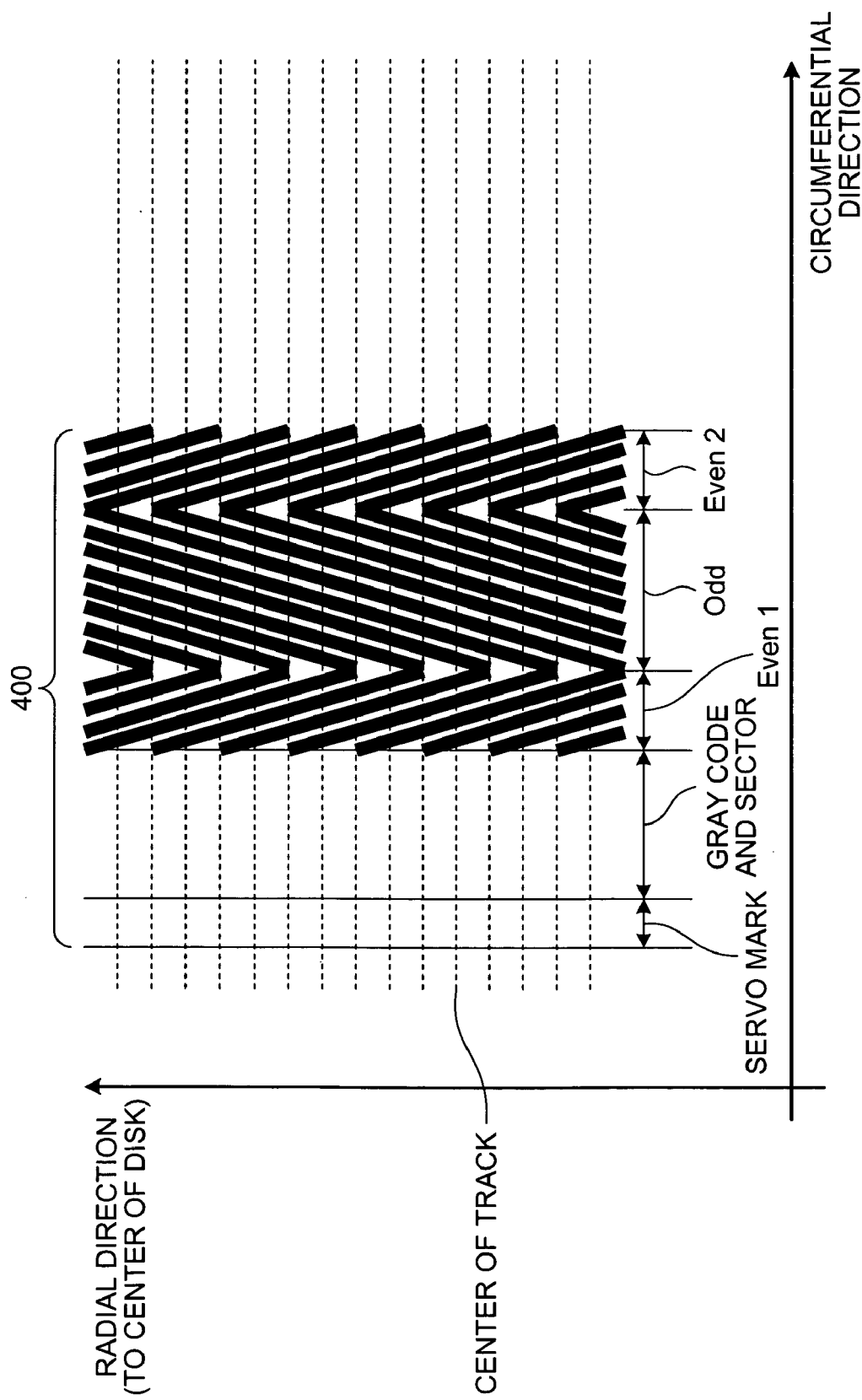
FIG. 4 is a schematic of patterns of the servo information.

Patterns of the servo information shown in FIG. 3 are described below. FIG. 4 is a schematic of the patterns of the servo information shown in FIG. 3. FIG. 4 is the schematic of an enlarged part of the servo patterns within a single sector. The enlarged part is extracted from the servo information 400 extending in the radial direction. The servo patterns of the servo information 400 within a single sector includes a servo mark, a gray code and sector, an Even 1, an Odd, and an Even 2, those arranged in an order that the magnetic head reads. Servo signals are reproduced by reading the information along the center of each track. The centers of tracks are shown as dashed lines in FIG. 4.

The servo mark indicates a start of the servo information. The gray code and sector is an area for storing binary coded decimal numbers therein, and a track number, which is gray coded, and a sector number of the magnetic disk are stored therein. The gray code store the track number of the magnetic disk, and the sector stores the sector number of the magnetic disk. The Even 1 and the Even 2 are servo information used for demodulating a position or a moving velocity of the magnetic head. The Even 1 and the Even 2 are diagonal patterns identical to each other with an equal angle to the circumference. It is possible to demodulate the moving velocity of the magnetic head from a phase difference between servo signals reproduced from the Even 1 and the Even 2 in the same track of the same sector. Odd is also servo information used together with the Even 1 and the Even 2 for demodulating positional information of the magnetic disk. The Even 1 and the Odd forms V shaped, and the Even 2 and the Odd forms inverse-V shaped.

The moving velocity of the magnetic head is obtained from nothing but the Even 1 and the Even 2 read from the servo information in the same track of the same sector. Therefore, the demodulated moving velocity becomes more effective and correct.

The present invention is not limited to the servo information having the servo patterns as described above. Also, the present invention is not limited to the servo pattern in a single sector used for obtaining a moving velocity of the magnetic head. Another servo pattern is acceptable such as a servo pattern across a plurality of sectors.

Figure 5:
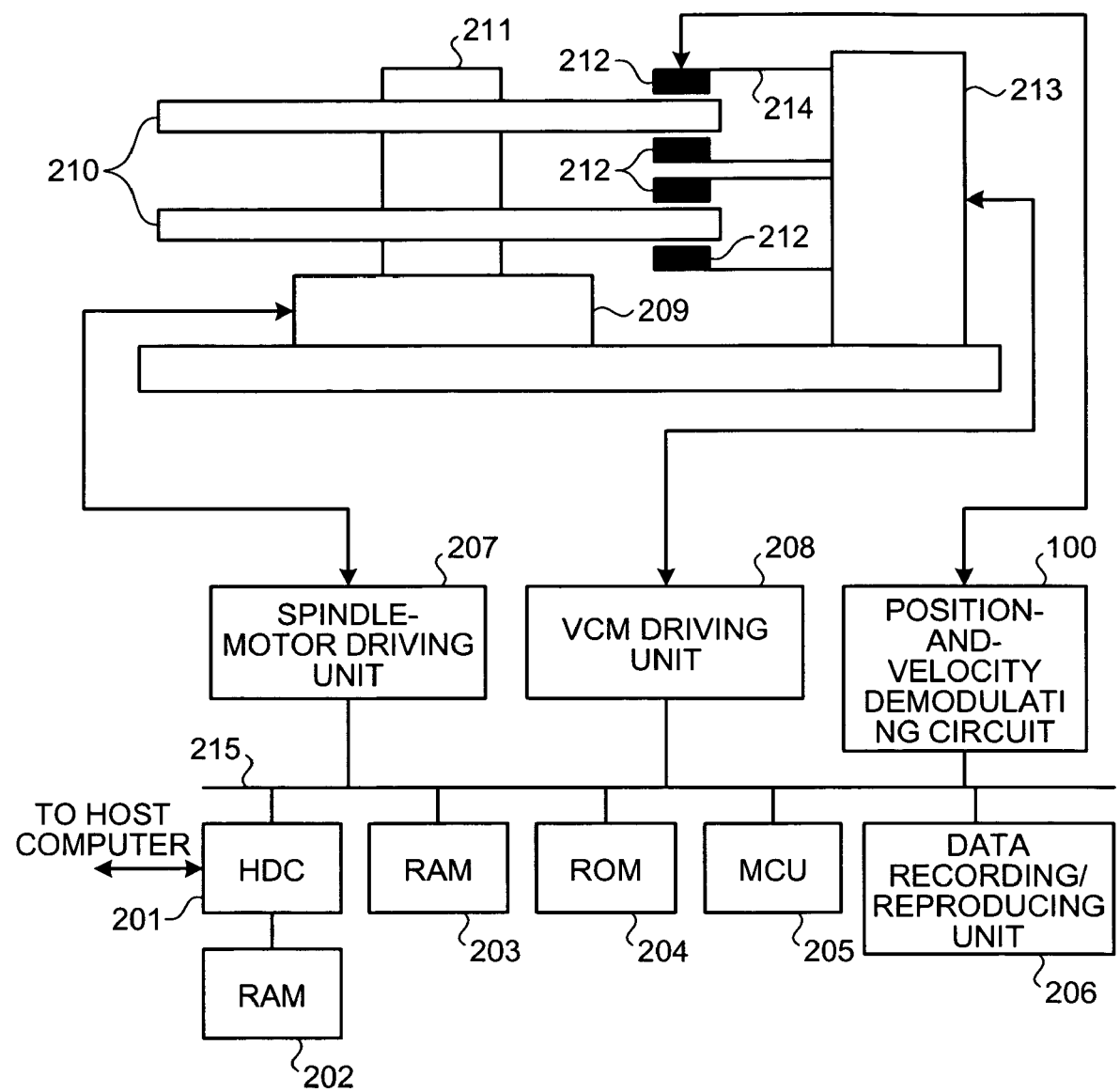
FIG. 5 is a functional block diagram of a configuration of the magnetic disk device.

FIG. 5 is a functional block diagram of the configuration of the magnetic disk device shown in FIG. 1. As shown in FIG. 5, the magnetic disk 210, which works as a magnetic storage medium, is provided at the spinning shaft 211 of the spindle motor 209. The spindle motor 209 drives the magnetic disk 210 to spin. The head actuator 214 is attached to an actuator that controls motions of the spindle 213. The magnetic head is attached to the end of the head actuator 214 and is moved in the radial direction on the magnetic disk 210.

The above actuator is composed of a VCM that rotates around a rotating shaft. In an example shown in FIG. 5, two magnetic disks 210 are mounted on the magnetic disk device 300 and four magnetic heads are simultaneously driven by the single actuator.

The magnetic head includes the read element and the write element. The magnetic head is configured to layer the read element including a magnetoresistive element on a slider and subsequently layer the write element including a write coil on the read-element layer.

A position-and-velocity demodulating circuit 100 converts a positional signal and a velocity signal read by the magnetic head from analog signals to digital signals. A data recording-and-reproducing unit 206 controls reading and writing operations by the magnetic head. A spindle-motor driving unit 207 drives the spindle motor 209. A VCM driving unit 208 drives the voice coil motor in the actuator described above by supplying a driving current thereto.

An MCU 205 demodulates a current position of the magnetic disk on the magnetic disk 210 from the digital positional signal sent from the position-and-velocity demodulating circuit 100, and calculates a VCM driving command value based on a positional error between the obtained current position and a target position and a velocity error between a target moving velocity and a current moving velocity of the magnetic head. It means that the MCU 205 performs positional demodulation, velocity demodulation, and servo control. Another device, such as a CPU or an MPU, can be used instead of the MCU 205.

A read only memory (ROM) 204 stores a control program executed by the MCU 205 therein. A hard disk controller (HDC) 201 determines a position of the magnetic head in a track by referring to a sector number from a servo signal, and records or reproduces data. A random access memory (RAM) 202, which is connected to the HDC 201, temporally stores data to be recorded or reproduced by the HDC 201 therein. A RAM 203 temporally stores read data or write data therein. The HDC 201 communicates with the host computer via an interface such as an advanced technology attachment (ATA) and a small computer system interface (SCSI). A bus 215 is connected to each of the above components.

Figure 6:
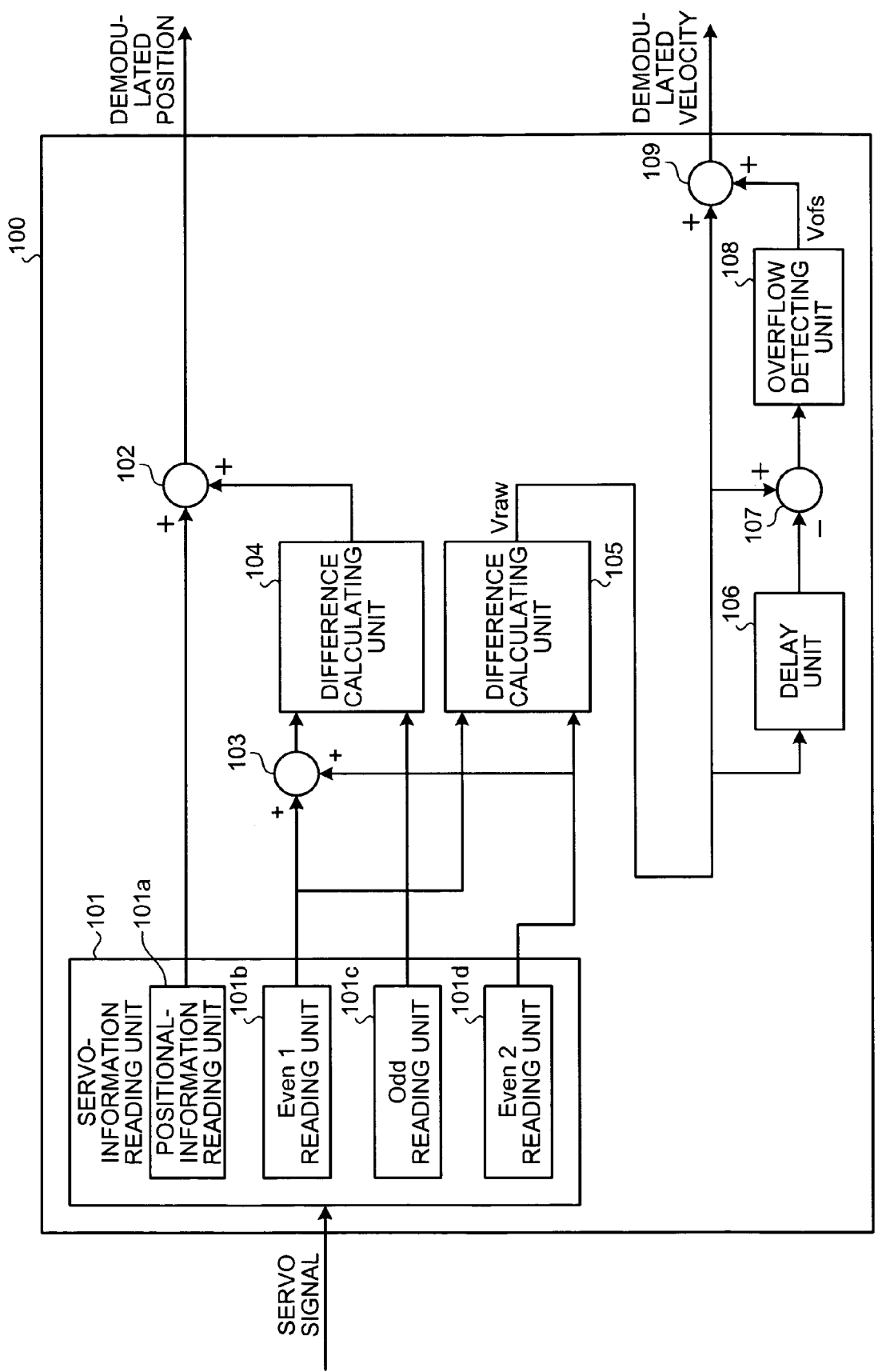
FIG. 6 is a functional block diagram of a configuration of a position-and-velocity demodulating circuit.

FIG. 6 is a functional block diagram of the configuration of the position-and-velocity demodulating circuit shown in FIG. 5. As shown in FIG. 6, the position-and-velocity demodulating circuit 100 includes a servo-information reading unit 101, adders 102 and 103, difference calculating units 104 and 105, a delay unit 106, a subtractor 107, an overflow detecting unit 108, and an adder 109. The adder 102, the adder 103, the subtractor 107, and the adder 109 are arithmetic and logic units for performing a predetermined calculation based on an input signal and outputting a result of the calculation.

The servo-information reading unit 101 is a processing unit for demodulating a position and moving velocity of the magnetic head from the read servo information. The servo-information reading unit 101 includes a positional-information reading unit 101a, an Even 1 reading unit 101b, an Odd reading unit 101c, and an Even 2 reading unit 101d.

The positional-information reading unit 101a inputs a track number, which is obtained from a demodulated analog signal read from the gray code and sector, into the adder 102. The Even 1 reading unit 101b inputs a demodulated analog signal read from the Even 1 into the adder 103 and the difference calculating unit 105. The Odd reading unit 101c inputs a demodulated analog signal read from Odd into the difference calculating unit 104. The Even 2 reading unit 101d inputs a demodulated analog signal read from the Even 2 into the adder 103 and the difference calculating unit 105.

Upon receiving the demodulated analog signal obtained from the Even 1 and the demodulated analog signal obtained from the Even 2, the adder 103 calculates an average of the two analog signals based on a vector operation to input the average into the difference calculating unit 104. The difference calculating unit 104 calculates a difference between the average and an analog signal received from the Odd reading unit 101c to input the difference into the adder 102.

Upon receiving the demodulated analog signal obtained from the Even 1 and the demodulated analog signal obtained from the Even 2, the difference calculating unit 105 calculates a phase difference between the two signals to obtain a moving velocity of the magnetic head (hereinafter, "Vraw"). The Vraw is input to the delay unit 106, the subtractor 107, and the adder 109.

Upon receiving the analog signal output by the positional-information reading unit 101a and the analog signal output by the difference calculating unit 104, the adder 102 demodulates the positional information of the magnetic head from the two received signals and converts the positional information into a digital signal to output the digital signal outside.

Upon receiving the Vraw, the delay unit 106 obtains a moving velocity of the magnetic head sampled at a cycle immediately before the Vraw cycle by delaying the Vraw in one cycle, and inputs the obtained moving velocity one cycle before the Vraw into the subtractor 107. Upon receiving the Vraw and the moving velocity one cycle before the Vraw, the subtractor 107 adds the Vraw and a value obtained by inversing a sign of the moving velocity one cycle before the Vraw, and inputs a result of the calculation into the overflow detecting unit 108.

Upon receiving the result from the subtractor 107, the overflow detecting unit 108 determines whether an absolute value of the result is larger than a threshold. When the absolute value is larger than the threshold, the overflow detecting unit 108 calculates a correction value (hereinafter, "Vofs"), which is added to the Vraw for correction. The Vofs is input into the adder 109.

Upon receiving the Vraw and the Vofs, the adder 109 corrects the Vraw with the Vofs, converts the corrected value into digital, and outputs the digitalized value to outside as a demodulated velocity.

Figure 7:
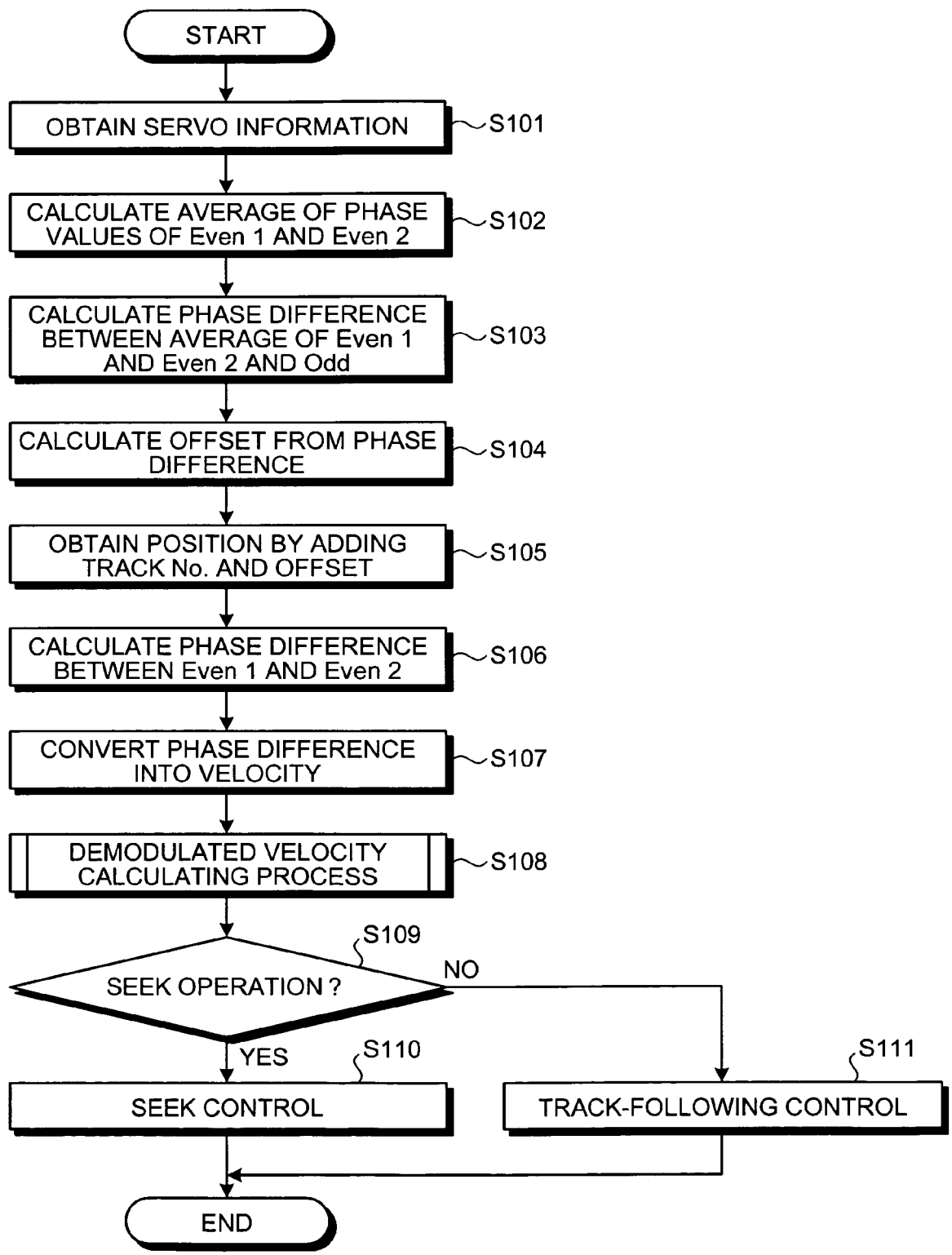
FIG. 7 is a flowchart for explaining a procedure for demodulating a position and a velocity.

FIG. 7 is a flowchart for explaining a procedure for demodulating the position and the velocity executed by the position-and-velocity demodulating circuit shown in FIG. 6. As can be seen from FIG. 7, the servo-information reading unit 101 obtains servo information (step S101). Next, the adder 103 calculates an average of phase values of the Even 1 and the Even 2 read from the servo information (step S102). The difference calculating unit 104 calculates a phase difference between the average of the Even 1 and the Even 2 and Odd (step S103).

The difference calculating unit 104 calculates an offset based on the phase difference calculated at step S103 (step S104). The offset is information on a difference between a position represented by the track number read from the gray code and sector and a position represented by the track obtained from the demodulated servo pattern. The adder 102 calculates a correct position of the magnetic head by adding the track number and the offset (step S105).

The difference calculating unit 105 calculates a phase difference between the Even 1 and the Even 2 (step S106), calculates a moving velocity of the magnetic head by dividing time T into a track width corresponding to the phase difference calculated at step S106 (step S107), and executes a process for calculating the demodulated velocity (step S108). The time T represents a period during which the magnetic head moves from a center of the Even 1 to a center of the Even 2.

The MCU 205 in the magnetic disk device 300 determines whether a seek operation (moving of the magnetic disk across the magnetic disk 210 in the radial direction) is in execution (step S109). When it is determined that a seek operation is in execution (Yes at step S109), the MCU 205 executes a seek control (step S110). When it is determined that a seek operation is not in execution (No at step S109), the MCU 205 executes a track-following control (step S111).

Figure 8:
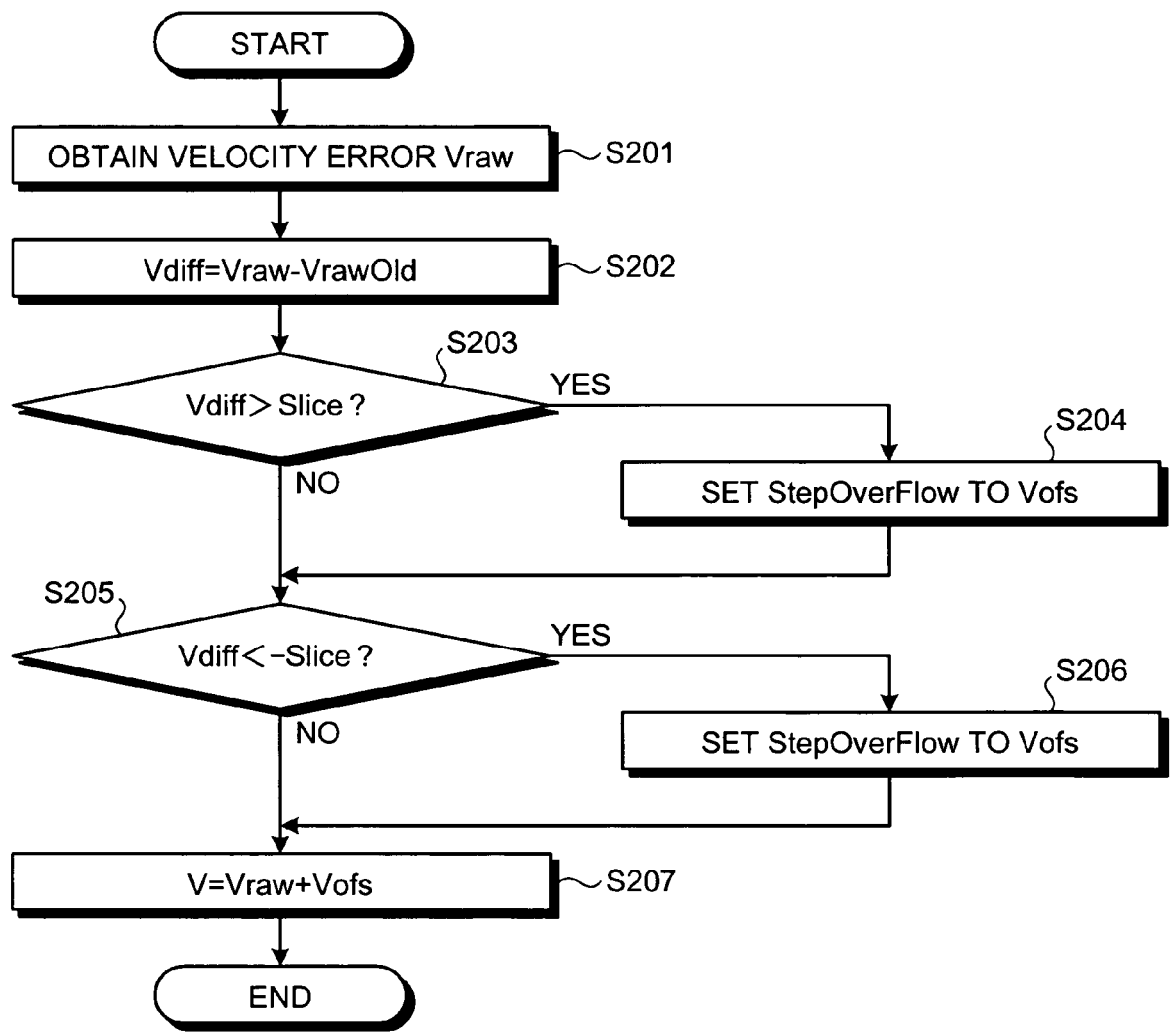
FIG. 8 is a flowchart for explaining a procedure for calculating a demodulated velocity.

The process for calculating the demodulated velocity in FIG. 7 is described below. FIG. 8 is a flowchart for explaining the procedure for calculating the demodulated velocity shown in FIG. 7. As shown in FIG. 8, the difference calculating unit 105 first obtains the velocity error Vraw (step S201). Next, the delay unit 106 delays a phase of Vraw to calculate VrawOld representing a velocity sampled at a cycle immediately before Vraw's cycle. The subtractor 107 subtracts the VrawOld from the Vraw to obtain Vdiff (step S202).

The overflow detecting unit 108 determines whether Vdiff is larger than Slice (threshold) (step S203). When it is determined that Vdiff is larger than Slice (Yes step S203), the overflow detecting unit 108 sets -StepOverFlow to Vofs (step S204) and the process moves to step S205. When it is determined that Vdiff is smaller than Slice (No step S203), the process moves to step S205.

At the step S205, the overflow detecting unit 108 determines whether Vdiff is smaller than -Slice (threshold) (step S205). When it is determined that Vdiff is smaller than -Slice (Yes step S205), the overflow detecting unit 108 sets StepOverFlow to Vofs (step S206), and the process moves to step S207. When it is determined that Vdiff is smaller than Slice (No step S205), the process moves to step S207.

StepOverFlow above described is a value of L/T. L indicates a distance between tracks, either track being located most closely to the other and having a signal reproduced from the servo information different one cycle from that of the other. T indicates a moving period from the center of the Even 1 to the center of the Even 2. It means that when the magnetic head moves during the time T to be over one cycle of a signal reproduced from a servo pattern, the magnetic head is incorrectly recognized, due to the cyclicity of the signal reproduced from the servo pattern, to have moved in a distance corresponding to a part over one cycle, and a distance corresponding to one cycle is failed to recognize. Therefore, it is necessary to reflect the missing distance corresponding to one cycle to the demodulated velocity by adding or subtracting the value of L/T to or from the demodulated velocity.

Finally, the adder 109 adds the Vofs and the Vraw to output a result the calculation as a demodulated velocity of the magnetic head "V".

Figure 9:
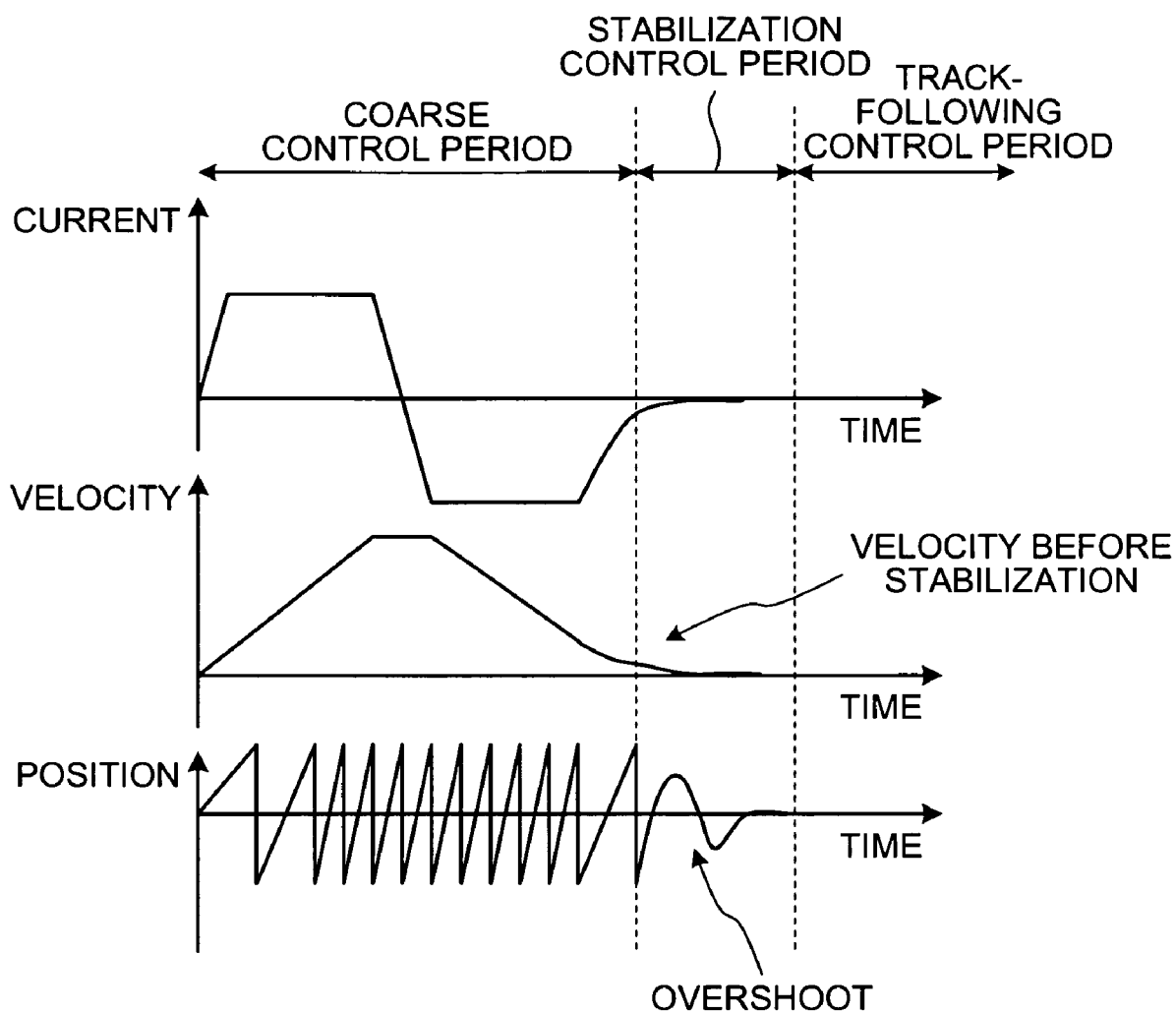
FIG. 9 is a graph for explaining a change in a seek waveform.

FIG. 9 is a graph for explaining the change in a seek waveform. FIG. 9 shows a change in the current, the velocity of the magnetic head, and the position of the magnetic head, as time has passed from a coarse control period to a track-following control period through a stabilization control period. The coarse control is a velocity control, and the stabilization control and the track-following control are position controls.

In the coarse control period under the high-speed seek operation, a predetermined amount of current is supplied to the voice coil motor. The velocity of the magnetic head increases or decreases, as the supplied current increase or decrease. In the coarse control period, the magnetic head moves from one track to another by the seek operation.

In the coarse control, control modes have shifted from an acceleration mode, a constant mode, to a deceleration mode. In the acceleration mode, the current is applied to cause the velocity to increase. In the constant mode, the current is not applied, i.e. 0 to cause the velocity to keep at a constant speed. In the deceleration mode, a backward current is applied to cause the velocity to reduce to zero at a target position or a nearby position. For a short moving, the constant mode is not used.

In all of the periods for the coarse control, the stabilizing control, and the track-following control, the current supplied to the voice coil motor is properly controlled to correct a positional error, which is detected from servo information demodulated by sector. Therefore, when the track-following control period starts after the coarse control period and the stabilization control period, the proper current for correcting the positional error, which is detected from the servo information demodulated by sector, is supplied to the voice coil motor, to operate the magnetic head to follow the center of the target track.

When the current with a certain amount is supplied to the voice coil motor in a seek operation, a mechanical resonance between the head actuator 214 and the magnetic head may be amplified. As a result, the magnetic head may vibrate even in the stabilization control period. The vibration in the stabilization control period is called an overshoot. If a large overshoot occurs, it is required a long stabilization control period until the overshoot has been over and the magnetic head starts following a center of a target track.

According to the present embodiment, it is possible to obtain a correct demodulated velocity by correcting the overflow associated with the demodulated velocity during the high-speed seek operation, and also possible to perform the accurate velocity control of the magnetic head based on the correct demodulated velocity. Specifically, it is possible to perform the accurate velocity control with capability of reacting to the overshoot of the magnetic head in the stabilization control period, which brings shortening the stabilization control period by reducing the large overshoot of the magnetic head and unnecessary vibrations of the magnetic head in the stabilization control period.

Figure 10:
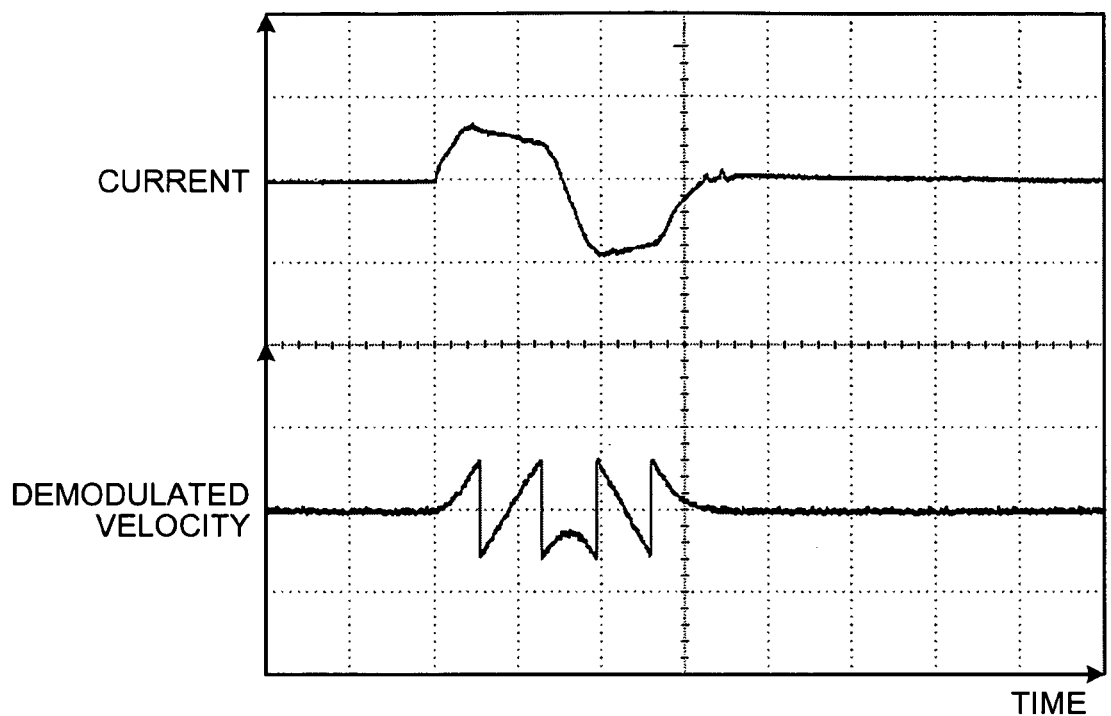
FIG. 10 is a graph for explaining a change in the demodulated velocity before overflow correction.
Figure 11:
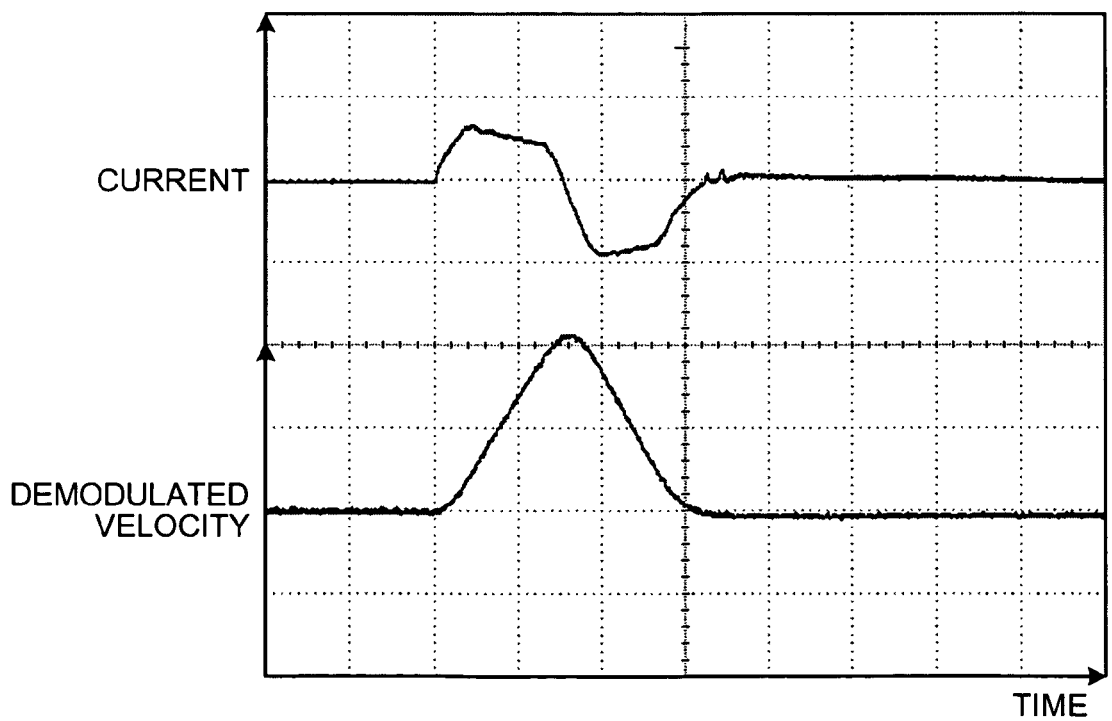
FIG. 11 is a graph for explaining a change in the demodulated velocity after overflow correction.

The demodulated velocity before the overflow correction and the demodulated velocity after the overflow correction are described below with reference to FIGS. 10 and 11. FIG. 10 is a graph for explaining a change in the demodulated velocity before the overflow correction, and FIG. 11 is a graph for explaining a change in the demodulated velocity after the overflow correction. FIGS. 10 and 11 show a relation between the current supplied to the voice coil motor and the demodulated velocity.

The demodulated velocity is changed, as the current changes. As can be seen from the graph before the overflow correction shown in FIG. 10, when the overflow associated with the demodulated velocity caused by the high-speed seek operation occurs, the demodulated velocity differs from the real velocity, so that an obtained waveform of the demodulated velocity erratically fluctuates.

According to the present embodiment, as can be seen from the graph after the overflow correction shown in FIG. 11, it is possible to correct the above waveform to a regular waveform by correcting the overflow associated with the demodulated velocity and filling in falls in the waveform the before correction caused by the different velocity. As a result, it is possible to perform an accurate feedback control of the magnetic head based on the demodulated velocity obtained after the overflow correction.

Although the present invention has been described with respect to the above embodiment, the present invention is not limited to the embodiment. Another embodiment is allowable within the scope of technical ideas described in claims. Also, effects of the present invention are not limited to those described herein.

The processes described in the above embodiments can be realized by executing a prepared computer program by a processing device such as an MCU, a CPU, and an MPU incorporated in the magnetic disk device 300. In the example shown in FIG. 5, various computer programs for executing processes described above are stored in the ROM 204. The MCU 205 reads the above computer programs from the ROM 204 to execute various processes for realizing functions of the position-and-velocity demodulating circuit 100.

It is not necessary to prestore the above computer programs in the ROM 204. The MPU 205 can read the computer programs from a physical storage medium with portability or an outside computer system that is connected to the magnetic disk device 300 via a network to execute the computer programs.

The above processes can be performed with a wired logic circuit instead of the method in which the MCU 205 reads codes prestored in the ROM 204 to execute the processes.

As describe above, according to an embodiment of the present invention, it is possible to perform an accurate moving control of a head by using a moving velocity of the head that is directly obtained from demodulated servo information, even when the head is moving at a high speed. Therefore, it is possible to read or write information from or to a storage medium with enough efficiency and rapidity.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that demodulates servo information read from a storage medium of a storage device via a head, the control device comprising:
a velocity demodulating unit that demodulates a moving velocity of the head based on the servo information; and
a velocity correcting unit that corrects the moving velocity, when an amount of change in demodulated moving velocity exceeds a predetermined threshold,
wherein the velocity correcting unit corrects the moving velocity by adding a correction moving velocity at a time when the head moves to a closest track having a reproduction signal from which the servo information has been reproduced being different by one cycle to the demodulated moving velocity, or by subtracting the correction moving velocity from the demodulated moving velocity.

2. The control device according to claim 1, wherein the velocity demodulating unit demodulates the moving velocity of the head based on the servo information in a single sector.

3. The control device according to claim 1, wherein the velocity demodulating unit demodulates the moving velocity of the head based on a phase difference of the servo information.

4. A storage device that includes a control device for demodulating servo information read from a storage medium via a head, the storage device comprising:
a velocity demodulating unit that demodulates a moving velocity of the head based on the servo information; and
a velocity correcting unit that corrects the moving velocity, when an amount of change in demodulated moving velocity exceeds a predetermined threshold,
wherein the velocity correcting unit corrects the moving velocity by adding a correction moving velocity at a time when the head moves to a closest track having a reproduction signal from which the servo information has been reproduced being different by one cycle to the demodulated moving velocity, or by subtracting the correction moving velocity from the demodulated moving velocity.

5. The storage device according to claim 4, wherein the velocity demodulating unit demodulates the moving velocity of the head based on the servo information in a single sector.

6. The storage device according to claim 4, wherein the velocity demodulating unit demodulates the moving velocity of the head based on a phase difference of the servo information.

7. A computer-readable recording medium that stores therein a computer program for demodulating servo information read from a storage medium via a head, wherein the computer program causes a computer to execute:

demodulating a moving velocity of the head based on the servo information; and correcting the moving velocity, when an amount of change in demodulated moving velocity exceeds a predetermined threshold, wherein the correcting includes correcting the moving velocity by adding a correction moving velocity at a time when the head moves to a closest track having a reproduction signal from which the servo information has been reproduced being different by one cycle to the demodulated moving velocity, or by subtracting the correction moving velocity from the demodulated moving velocity.

8. The computer-readable recording medium according to claim 7, wherein the demodulating includes demodulating the moving velocity of the head based on the servo information in a single sector.

9. The computer-readable recording medium according to claim 7, wherein the demodulating includes demodulating the moving velocity of the head based on a phase difference of the servo information.

10. A method of demodulating servo information read from a storage medium via a head, the method comprising:

demodulating a moving velocity of the head based on the servo information; and correcting the moving velocity, when an amount of change in demodulated moving velocity exceeds a predetermined threshold, wherein the correcting includes correcting the moving velocity by adding a correction moving velocity at a time when the head moves to a closest track having a reproduction signal from which the servo information has been reproduced being different by one cycle to the demodulated moving velocity, or by subtracting the correction moving velocity from the demodulated moving velocity.

* * * * *